United States Patent [19]

Meraldi et al.

[11] Patent Number: 5,582,911
[45] Date of Patent: Dec. 10, 1996

[54] ARAMID MONOFILAMENT HAVING A SLIGHTLY STRUCTURED SKIN—PROCESS FOR PRODUCING THIS MONOFILAMENT

[75] Inventors: Jean-Paul Meraldi, Zurich; Joel Ribiere, Wallisellen; Jean-Jacques Almon, Dübendorf, all of Switzerland

[73] Assignee: Michelin Recherche et. Technique, S.A., Fribourg, Switzerland

[21] Appl. No.: 293,117

[22] Filed: Aug. 19, 1994

Related U.S. Application Data

[63] Continuation of Ser. No. 923,916, filed as PCT/CH91/00276 Dec. 20, 1991 published as WO92/12279 Jul. 23, 1992, abandoned.

Foreign Application Priority Data

Dec. 27, 1990 [FR] France ............................... 90 16595

[51] Int. Cl.⁶ ................................................ D02G 3/00
[52] U.S. Cl. .................... 428/364; 428/373; 264/184; 528/336
[58] Field of Search ............................ 428/364, 373; 264/184; 528/336, 315

[56] References Cited

U.S. PATENT DOCUMENTS

| | | | |
|---|---|---|---|
| 3,558,763 | 1/1971 | Quynn et al. | 264/184 |
| 3,627,737 | 12/1971 | Smith | 528/315 |

(List continued on next page.)

FOREIGN PATENT DOCUMENTS

| | | |
|---|---|---|
| 53834 | 2/1976 | Germany. |
| 51220 | 7/1993 | Germany. |
| 51221 | 7/1993 | Germany. |
| 51223 | 7/1994 | Germany. |

OTHER PUBLICATIONS

WO,A,9 100 381 (Michelin Recherche Technique S.A.) 10 Janvier 1991.
World Patents Index Latest Section Ch, Week 8618, Derwent Publications Ltd., London, GB; Class A, AN 86–115596 & JP,A,61 055 210 (Unitika K.K. 19 Mars 1986.
World Patents Index Section CH, Week 7940, Derwent Publications Ltd., London, GB; Class A, AN 79–72402B & JP, A, 54 107 003 (Asahi Chemical Ind. K.K.) 22 Aout 1979.

Primary Examiner—Newton Edwards
Attorney, Agent, or Firm—Brumbaugh, Graves Donohue & Raymond

[57] ABSTRACT

An aramid monofilament having high mechanical properties is provided. This monofilament has a slightly structured skin and resists fibrillation and abrasion. In addition, a process for the production of this monofilament is also provided. The process includes the following steps:

(i) a solution of aromatic polyamide(s) is extruded as a liquid jet in a spinneret through a capillary; (ii) the jet is drawn from the capillary in a non-coagulating layer of fluid and (iii) the drawn liquid vein is introduced into a coagulating medium in order to form the monofilament, which is subsequently washed, dried and contacted with a solvent for said monofilament to produce the slightly structured skin. The aramid monofilament is characterized by the following relationships:

$1.7 \leq Ti \leq 260$;

$40 \leq D \leq 480$;

$T \geq 180 - D/3$;

$Mi \geq 1600$;

$Ar > 2.00$; and $Er > 20 - D/30$.

In the above relationship, Ti represents linear density in tex, D represents diameter in μm (micrometers), T represents tenacity in cN/tex, Mi represents the initial modulus in cN/tex, Ar represents the elongation upon rupture in % and Er represents the energy upon rupture per unit of mass in J/g. Assemblages of such monofilaments are also provided, as well as articles reinforced by these monofilaments or assemblages, such articles being, for instance, automobile tires.

24 Claims, 3 Drawing Sheets

U.S. PATENT DOCUMENTS

| | | | |
|---|---|---|---|
| 3,671,542 | 6/1972 | Kwolek | 264/184 |
| 3,767,756 | 10/1973 | Blades | 264/184 |
| 3,869,430 | 3/1975 | Blades | 528/336 |
| 4,368,615 | 1/1983 | Lammers | 264/184 |
| 4,374,978 | 2/1983 | Fujiwara et al. | 264/184 |
| 4,511,623 | 4/1985 | Yoon et al. | 428/364 |
| 4,728,473 | 3/1988 | Satoh et al. | 264/184 |
| 4,876,040 | 10/1989 | Park et al. | 264/184 |
| 4,965,033 | 10/1990 | Chiou | 264/184 |
| 5,246,776 | 9/1993 | Meraldi et al. | 428/364 |

ARAMID MONOFILAMENT HAVING A SLIGHTLY STRUCTURED SKIN—PROCESS FOR PRODUCING THIS MONOFILAMENT

This application is a continuation of U.S. application Ser. No. 07/923,916, filed ad PCT/CH91/00276 Dec. 20, 1991 published as WO92/12279 Jul. 23, 1992, now abandoned.

BACKGROUND OF THE INVENTION

The present invention relates to so-called "aramid" fibers, that is to say fibers of linear macro-molecules made from aromatic groups joined by amide linkages at least 85% of which are joined directly to two aromatic rings and, more precisely, to aramid fibers made from optically anisotropic spinning compositions.

In known manner, aramid fibers of high strength and high modulus are characterized generally by fibrillation phenomena on the surface of their filaments and low resistance to abrasion. These weak points and/or certain processes for remedying them have, for example, been described in the case of conventional aramid fibers of small filament diameter in the following patents or patent applications:

EP-A-163,403, EP-A-332,919, U.S. Pat. No. 4,670,343, JP-A-01/85 3772, JP-A-63/243,330.

This fragility, which is harmful for certain properties of use of these fibers, may also be harmful to those of their assemblages or to those of the articles reinforced by these fibers or assemblages.

International application PCT/CH90/00155, incorporated by reference in the present application, describes aramid monofilaments having both a large diameter and high mechanical properties in the as-spun state.

However, these aramid monofilaments are, as a whole, subject to the same weaknesses as those described above. It was therefore clearly desirable to produce aramid monofilaments the resistance to fibrillation and abrasion of which is greatly improved.

SUMMARY OF THE INVENTION

The object of the invention is to provide an aramid monofilament having not only a large diameter and high mechanical properties but also possessing a new surface structure which confers upon it better resistance to fibrillation and abrasion as well as better properties of adhesion than those of the aramid monofilament described in said international application. This new aramid monofilament furthermore has high properties of energy upon rupture.

The aramid monofilament in accordance with the invention is characterized by the following features:

(a) it satisfies the following relationships:
 $1.7 \leq Ti \leq 260$;
 $40 \leq D \leq 480$;
 $T \geq 180 - D/3$;
 $Mi \geq 1600$;
 $Ar > 2.00$;
 $Er > 20.0 - D/30$;

Ti being the titer in tex, D being the diameter in µm (micrometers), T being the tenacity in cN/tex, Mi being the initial modulus in cN/tex, Ar being the elongation upon rupture in %, Er being the energy upon rupture per unit of mass in J/g for this monofilament;

(b) it has a slightly structured skin.

The invention also concerns a process for obtaining such a monofilament.

The process of the invention is characterized by the following steps:

(a) a solution is formed of at least one aromatic polyamide such that at least 85% of the amide linkages (—CO—NH—) are joined directly to two aromatic rings, the inherent viscosity I.V.(p) of this polyamide or these polyamides being at least equal to 4.5 dl/g and the concentration C of polyamide(s) in the solution being at least 20% by weight, this spinning composition being optically anisotropic in the molten state and at rest;

(b) this solution is extruded in a spinneret through a capillary the diameter "d" of which is greater than 80 µm, the spinning temperature Tf, that is to say the temperature of the solution upon its passage through the capillary, being at most equal to 105° C.;

(c) the liquid jet emerging from the capillary is drawn in a noncoagulating layer of fluid;

(d) the drawn liquid vein thus obtained is then introduced into a coagulating medium, the monofilament which is thus undergoing formation remaining in dynamic contact with the coagulating medium for the time "t", the temperature of the coagulating medium Tc being at most equal to 16° C.;

(e) the monofilament is washed and dried;

(f) the washed and dried monofilament is contacted with a solvent for this monofilament, this treatment solvent being capable of rapidly dissolving its surface so as to produce a slightly structured skin;

(g) the monofilament thus obtained is washed and dried; the diameter D of the dry monofilament which has thus been finished and the time t defined in step (d) are related by the following relationships:

$t = KD^2; K > 30$, t being expressed in seconds and D being expressed in millimeters.

The monofilament in accordance with the invention can be used either by itself or in the form of assemblages, for instance to reinforce articles, particularly articles of plastic and/or rubber, such articles being, for instance, belts, tubes, reinforcement plies and automobile tires, the invention also concerning these assemblages and these articles reinforced in this manner.

DESCRIPTION OF THE DRAWINGS

The invention will be readily understood by means of the examples which follow and the diagrammatic figures concerning these examples.

In the drawing.

DESCRIPTION OF PREFERRED EMBODIMENTS

I. Test Methods Used

A. Conditioning

Figure 1:
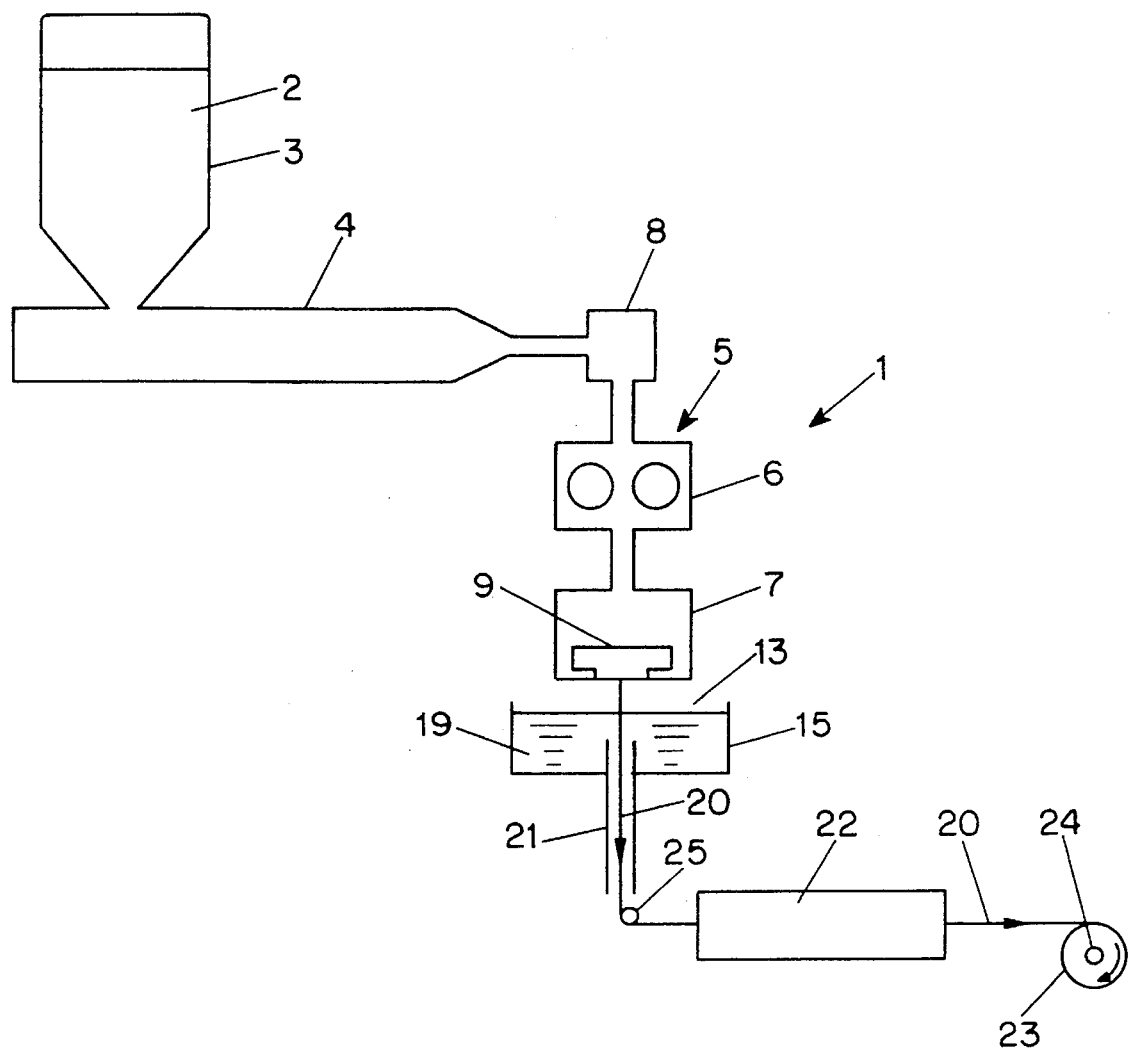
FIG. 1 shows a spinning apparatus.

By conditioning there is understood in the present specification the treatment of the monofilaments in accordance with European Standard EN 20139 of August 1992, which substantially provides as follows:

A standard temperature atmosphere for testing is an atmosphere which has a 65±2% relative humidity and a temperature of 20°±2° C. Before a textile is tested to determine a physical or mechanical property, it is conditioned by placing it in the standard atmosphere for testing, in such a way that the air flows freely through the textile, and it is kept there for the time required to bring it into equilibrium with the atmosphere. The textile is considered to be in equilibrium when successive weighings, at intervals of 2 h, of the textile materials freely exposed to the moving air show no progressive change in mass greater than 0.25%.

B. Titer

The titer (or linear density) of the monofilaments is determined in accordance with Federal Republic of Germany Standard DIN 53830 of June 1965. Federal German Standard DIN 53830 substantially provides as follows:

The "count," which is synonymous with "titer," is the quotient of the weight and the length of the material in question and is expressed in tax. The weight upon which the count is based is determined in standard condition (i.e., conditioned to the standard climate (20°±2°)°C. and (65±2) % relative atmospheric humidity).

Skeins of a specified length with no interruptions are reeled off as samples. Interruptions include any connections in the form of knots, seals or bonds.

A six-arm precision reel with a circumference of (1000±2.5) mm fitted with an even winding mechanism and an automatic counter for displaying the reeled length is used. When the test skeins are reeled, the yarns are under the tensile force specified as follows:

| COUNT, TEX | PRETENSION FORCES, cN |
| --- | --- |
| UP TO 1.2 | 0.50 |
| OVER 1.2 TO 1.6 | 0.70 |
| OVER 1.6 TO 2.4 | 1.00 |
| OVER 2.4 TO 3.6 | 1.50 |
| OVER 3.6 TO 5.4 | 2.25 |
| OVER 5.4 TO 8.0 | 3.35 |
| OVER 8.0 TO 12 | 5.00 |
| OVER 12 TO 16 | 7.00 |
| OVER 16 TO 24 | 10.0 |
| OVER 24 TO 36 | 15.0 |
| OVER 54 TO 80 | 33.5 |
| OVER 80 TO 120 | 50.0 |
| OVER 120 TO 160 | 70.0 |
| OVER 160 TO 240 | 100 |
| OVER 240 TO 360 | 150 |
| OVER 360 TO 540 | 225 |
| OVER 540 TO 800 | 335 |

The skeins are individually weighed immediately after the length measurement; balance with an error margin of maximum 0.1% of the skein weight. The count in tex is calculated from the weight m in mg and the length l in meters of the skein. For each monofilament the measurement is carried out by weighing on at least three previously conditioned samples, each corresponding to a length of 50 m. The titer corresponds to the average of the measurements of the samples for the monofilament in question, and it is expressed in tex.

C. Density

The densities of the monofilaments are measured by using the density gradient tube technique for plastic materials specified in ASTM Standard D1505-68 (reapproved in 1975), Method C, using a mixture of 1,1,2-trichlorotrifluoroethane and
1,1,1-trichloroethane as liquid system for the density gradient tube.

The samples used are short lengths of about 2 cm of monofilaments, knotted but not closely. Before measurement, they are immersed for two hours in the component of the liquid system which has the lowest density. They then remain in said tube for 12 hours before being evaluated. It is particularly seen to it that no air bubbles are retained on the surface of the monofilaments.

The density is determined in $g/cm^3$ for 2 samples per monofilament and the average value is reported in 4 significant places.

D. Diameter

Unless otherwise indicated, the diameter of the monofilaments is calculated on basis of their titer and density, in accordance with the formula:

$$D = 2 \times 10^{1.5} (Ti/\pi\rho)^{1/2}$$

D representing the diameter of the monofilaments in μm, Ti representing the titer in tex, and ρ representing the density in $g/cm^3$.

E. Mechanical Properties

The mechanical properties of the monofilaments are measured by means of a traction machine of Zwick GmbH & Co. (Federal Republic of Germany), type 1435 or type 1445, in accordance with the procedure described in Federal German Standard DIN 53834 of February 1976. Federal German Standard DIN 53834 substantially provides as follows:

A simple tensile test is used to establish the tensile-force linear-deformation characteristic including the tensile force and the linear deformation just prior to rupture of the test specimen.

A single test specimen can be of any continuous length. Any join, be it in the form of a knot, welded, bonded or otherwise, is considered to be discontinuous. A knot-free length of approximately 50 m is wound off as a sample. Before the test, the wound-off samples must be conditioned in a standard atmosphere of (20°±2°)°C. and (65±2) % relative humidity. Test specimens for the tensile tests are continuously removed. from the unwound 50 m long conditioned sample. Moreover, twists in the specimens must not become untwisted, displaced or curled throughout the test preparing period and while the test specimens are being clamped in the grips.

The strain rate is the speed with which the two clamping grips of the test instrument move apart. The test is performed at a strain rate adjusted as follows:

| AT MAXIMUM TENSILE FORCE STRAINS | ADJUSTED STRAIN RATE |
| --- | --- |
| Up to 5% | 50 mm/min |
| Up to 40% | 250 mm/min |
| Over 40% | 500 mm/min |

The maximum tensile force strain is established by preliminary tests so that the strain rate can be adjusted accordingly. Comparative examinations are based on the same strain rate, independent of the maximum tensile stain level. The test is carried out until rupture. Breaks at the grips are not considered in the test evaluation.

A tensile-force linear-deformation curve is plotted with each test. The course of the curve is used to check the behavior of the test specimen during the tensile test, particularly test specimen slip in the grips. The curve also yields the initial modulus, energy at rupture, and tenacity.

The monofilaments are subjected to traction over an initial length of 400 mm. All the results are obtained with an average of 10 measurements.

The tenacity (T) and the initial modulus (Mi) are indicated in cN/tex (centinewtons per tex).

The elongation upon rupture (Ar) is indicated in percent (%).

The initial modulus (Mi) is defined as the slope of the linear portion of the curve representing the variations of the force as a function of the elongation, this linear portion being present just after the standard pretension of 0.5 cN/tex.

The energy upon rupture per unit of mass (Er) is expressed in J/g (joules per gram) and is determined in accordance with DIN Standard 53834 of February 1976, referred to above.

F. Inherent Viscosity

The inherent viscosity (I.V.) is determined for the polymer and the monofilaments. I.V.(p) represents the inherent viscosity of the polymer and I.V.(f) that of the monofilament. In both cases it is expressed in deciliters per gram and defined by the equation:

$$I.V.=(1/C) \: Ln \: (t1/t0)$$

in which

C is the concentration of the polymer solution (0.5 g of polymer or monofilament in 100 cm$^3$ of solvent). The solvent is 96% concentrated sulfuric acid.

Ln is the natural logarithm.

t1 and t0 represent the flow time of the polymer solution and of the pure solvent respectively, at 30°±0.1° C. in a Ubbelohde type capillary viscosimeter.

G. Analysis by Electronic Micro-Diffraction

A Philips transmission electronic microscope of type CM 12 is used under an acceleration voltage of 120 kV. The electronic microdiffraction observations are carried out on sagittal longitudinal cuts of a thickness close to 50 nm. The technique used is the so-called "parallel beam" technique, the size of the spot at the level of the sample being about 50 nm. The microdiffraction photographs are recorded on high-speed Agfa film.

H. Optical Characteristics

The optical anisotropy of the spinning compositions, in the molten state and at rest is observed by means of an Olympus BH2 type polarization microscope, equipped with a heating stage.

This microscope serves, furthermore, for the optical examination of the monofilaments, for instance for the observation of their transverse cuts.

The surface of the monofilaments is observed also by means of a JEOL scanning electron microscope, type 25S-III, under an acceleration voltage of 12.5 kV.

I. Resistance to Auto-Abrasion Under Curvature

In order to evaluate the resistance to auto-abrasion of the monofilaments and, more generally their fatigue strength, a "filament against filament" friction test under curvature is employed.

Two short lengths of the same monofilament of a length of about 25 cm are used. The first length, referred to as static filament, is held along a substantially horizontal axis by means of two grooved rollers which are fixed in position about 5 cm apart. This filament is subjected to a tension T1 by means of constant weights fastened to its ends. The second length, called the dynamic filament, which is itself subjected to a tension T2 by means of a constant weight fastened to one of its ends, is stretched on the static filament and curved around it with an angle of curvature of about 90°.

A mechanical device to which the other end of the dynamic filament is fastened assures the forced and repeated sliding of this dynamic filament on the static filament in accordance with an alternating linear movement of given frequency and amplitude. The vertical plane containing the axis of the dynamic filament is always substantially perpendicular to the vertical plane containing the axis of the static filament.

At the start of the test, the tension T1 applied to the static filament is substantially equal to twice the tension T2 applied to the dynamic filament. These conditions make it possible to maintain the angle of curvature of the dynamic filament at a value close to 90°. The number of auto-abrasion cycles is recorded until one of the two filaments breaks. The auto-abrasion resistance of the monofilament in question is established by the average number of cycles recorded upon rupture for 10 measurements.

J. Adhesion Measurements

The adhesion measurements of the monofilaments are carried out on assemblages of these monofilaments.

The assemblages are inserted between two layers of rubber mixes in such a manner that the assemblages are arranged in a plane, forming U-shaped loops of the arms of which are parallel, the curved portion to the U's being arranged on the outside of the layers of rubber.

The rubber mixes have the following composition (parts by weight):

| | |
|---|---|
| Natural rubber | 50 |
| SBR | 30 |
| PBR | 20 |
| Black | 50 |
| ZnO | 5 |
| Stearic acid | 1 |
| Antioxidant | 1 |
| Sulfur | 2 |
| Accelerator | 1 |

PBR: Polybutadiene rubber;

Antioxidant: Santoflex® 13 of Monsanto;

Accelerator: Sulfenamide type.

The test specimens thus obtained are placed in a mould and vulcanized at 160° C. for 15 minutes under a pressure of 15 daN/cm$^2$.

The adherence is characterized by the measurement of the force necessary to tear the loops from the rubber composition, this composition being either at room temperature (20° C.) or at elevated temperature (120° C.) during this measurement. This force is determined for each loop with a rate of pulling of 100 mm/min, and at the end of the operation the average force per arm is calculated, taking the average of 12 measurements.

II. Preparation of Monofilaments

A. Polymer

The aramid monofilaments are prepared from aromatic polyamides capable of generating optically anisotropic spinning compositions in the molten state and at rest.

Each aromatic polyamide used in the process of the invention may be a homopolymer or a copolymer, this polyamide having aromatic and possibly non-aromatic units These units may, for instance, be formed of radicals or groups of the phenylene, biphenylene, diphenyl ether, naphthalene, thylene pyridylene, vinylene, polymethylene, polybenzamide or diaminobenzanilide type, these radicals or groups being possibly substituted and/or non-substituted, the substituents, when present, being preferably nonreactive. This polyamide may possibly contain imide linkages.

The method of the invention can be carried out with a mixture of such polyamides. The polymer is preferably a poly(p-phenylene terephthalamide) (PPTA) or a polyamide of PPTA type. By this expression there is understood a polyamide which comprises p-phenylene terephthalamide units.

The aromatic polyamides used in the examples which follow are poly(p-phenylene terephthalamides), and copolyamides of PPTA type, that is to say copolyamides comprising p-phenylene terephthalamide units and additional units of aromatic or aliphatic nature.

The poly(p-phenylene terephthalamides) are prepared by the following known method: A solution of N-methylpyrrolidone containing a percentage by weight of calcium chloride of more than 5% is introduced into a mixer, swept by a stream of nitrogen, which is equipped with an agitator and a cooling device. Crushed p-phenylene diamine is then added, under agitation. After the dissolving of the diamine, the content of the mixer is cooled to about 10° C. The crushed terephthaloyl dichloride is then added in substantially stoichiometric proportion, and the agitation continued. All the reagents used are at room temperature (about 20° C.) before they are introduced into the reactor. At the end of the reaction, the mixer is emptied, and the product obtained is coagulated with water, washed and dried.

The copolyamides of PPTA type are prepared by the method described above with the following changes: A molar fraction of p-phenylene diamine or terephthalic acid dichloride is replaced by another diamine or another acid dichloride, respectively. The acid chloride or chlorides and the diamine or diamines are in substantially stoichiometric proportions.

B. Preparation of the Solution

The spinning solution is prepared by the following known method:

Concentrated sulfuric acid of a concentration by weight close to 100% is introduced into a planetary mixer the double jacket of which is connected to a cryostat. Under agitation and a stream of nitrogen, the acid is cooled to a temperature at least 10° C. below its crystallization temperature; the agitation is continued until a homogeneous mass having the appearance of snow is formed.

The polymer is then added; the temperature of the polymer before introduction into the mixer is not critical; the polymer is preferably at room temperature. The mixing of the acid and the polyamide is effected formed with agitation, the temperature of the mixture being maintained at a value 10° C. less than the crystallization temperature of the acid, until obtaining sufficient homogeneity. The temperature in the mixer is then gradually increased to room temperature while agitating. A dry solid noncohesive powder is thus obtained.

In the case of a batch process, this solid solution can be kept at room temperature without danger of degradation before the spinning operation. However, prolonged exposure to a humid atmosphere should be avoided.

In practice, for the carrying out of the tests described below, the amount of polymer necessary to obtain the desired concentration is generally mixed with to 8 kg of sulfuric acid. Before the spinning operation, a sample of solution is taken and weighed. It is then coagulated, carefully washed with water, dried under vacuum and weighed, in order to determine the concentration (% by weight, indicated as C below) of polymer in the solution.

The spinning compositions described in the present application are optically anisotropic in the molten state and at rest, that is to say in the absence of dynamic stress. Such compositions depolarize light when they are observed through a microscope between crossed linear polarizers.

C. Spinning and Treatment

The solutions obtained by the process described in the preceding section are spun by the so-called "noncoagulating fluid layer" spinning technique (dry jet-wet spinning). FIG. 1 shows such a spinning apparatus 1. The solid spinning solution 2, which has been previously deaerated at room temperature in a feed tank 3, is extruded through a single-screw extruder 4 towards the spinning block 5. It is melted during this extrusion phase, under strong shearing, at a temperature which is generally between 90° and 100° C.

Prolonged stays at a temperature substantially above 100° C. may result in degradation of the polymer, which, however, can easily be checked by an inherent viscosity measurement I.V.(f) on the monofilament. Therefore, one generally employs, in front of the block 5, a temperature which is as low as possible but sufficient to assure the solution the fluidity necessary for its spinning operation. For these reasons, the temperature of the spinning solution during its transfer towards the spinning block 5 is maintained at a value below 110° C. and preferably below 100° C.

The spinning block 5 is formed essentially of a metering pump 6 and of a spinning head 7 through which the liquid solution 2 is extruded. Various elements such as filters and static mixers for instance may be incorporated in the block 5 or placed at the entrance to it, FIG. 1 showing by way of example a filtration device 8. The temperature of the spinning pump 6 is preferably below 100° C., for the same reasons as previously mentioned.

The spinning head 7 is formed essentially in known manner of a distributor, filters, joints and a spinneret, only the spinneret 9 being shown in FIG. 1 for purposes of simplification. A portion of this spinneret 9 is shown in greater detail in FIG. 2; it comprises a cylindrical capillary 10 of diameter d and length l, preceded by a convergent 11 of angle β which may be preceded or not by a cylindrical counterbore (not shown in FIG. 2), FIG. 2 being a section through the spinneret 9 in a plane passing through the axis xx' of the capillary 10, d being determined in a plane perpendicular to the axis xx'.

The velocity $V_1$ of the jet 12 is the average velocity of passage of the solution 2 in the capillary 10 of the spinneret 9; it can be calculated from the volume of solution 2 passing through the capillary 10 per unit of time.

The spinning temperature Tf is defined as the temperature of the solution 2 upon passage through the capillary 10.

Figure 2:
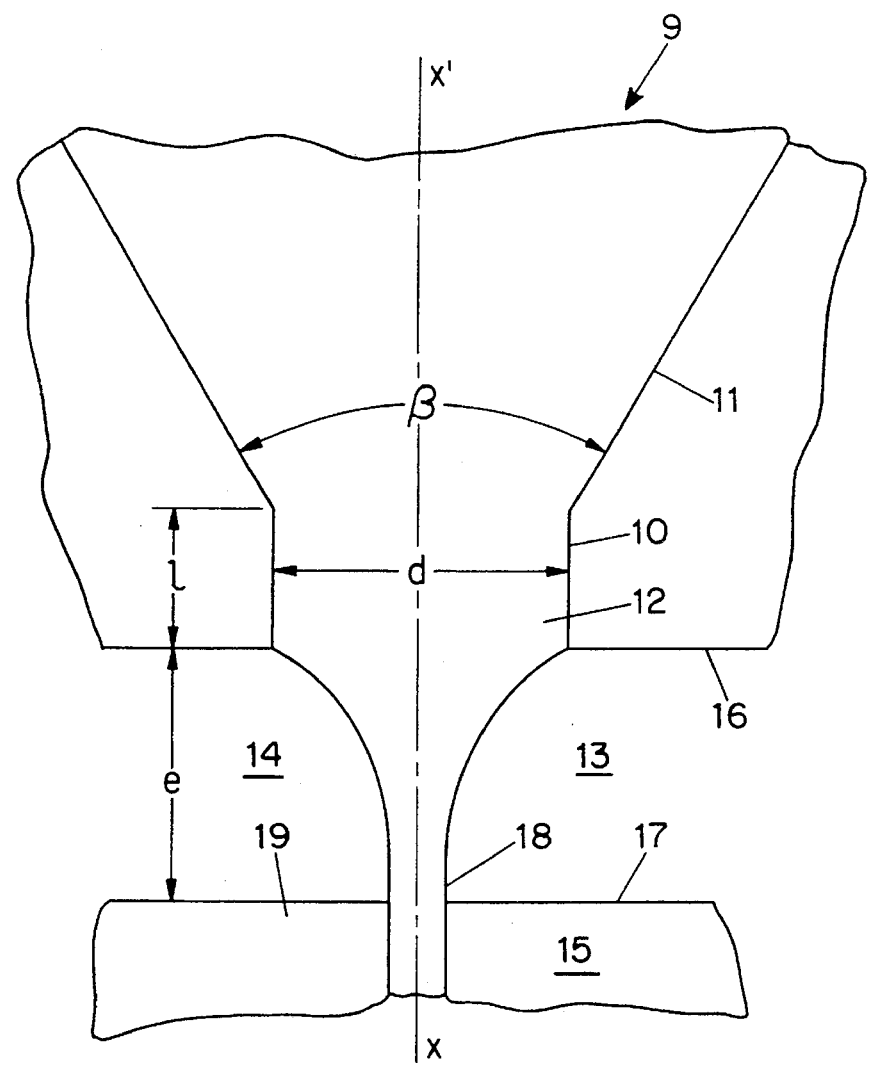
FIG. 2 is a section through a spinneret used in the apparatus of FIG. 1.

The jet 12 of liquid emerging from the spinneret 9 is drawn into a noncoagulating layer 13 of gas 14, preferably a layer of air, before penetrating into the coagulation bath 15 (FIGS. 1 and 2). The thickness "e" of the layer of air between the outlet face 16 of the spinneret 9, said face being arranged horizontally, and the surface 17 of the coagulation bath 15 may vary from a few mm to several tens of mm.

After passing through orientation fields developed in the spinneret 9 and in the air layer 13, during which a reorientation has been imparted to the polymer molecules, the drawn liquid vein 18 thus obtained penetrates into the coagulating medium 19 of the bath 15 in which one starts to freeze this oriented structure counteracting in the best way possible the processes of molecular relaxation which take place during the coagulation phase, and this all the longer the greater the diameter of the monofilament to be produced.

In everything which follows, and very generally, there is understood by coagulation the process during which the thread is formed, that is to say during which the polyamide precipitates or crystallizes, whether it be in a solvated, partially solvated or nonsolvated state. By coagulating medium there is understood a liquid medium in which such a transformation takes place.

The coagulating medium 19 can be formed, at least in part, of water or substances such as acids, bases, salts or organic solvents such as, for instance, alcohols, polyalcohols, ketones or a mixture of these compounds. The coagulating medium is preferably an aqueous solution of sulfuric acid.

Upon emergence from the bath 15, the thread 20 which is in course of formation is carried along with the coagulating medium 19 into the vertical tube 21, the length of which varies, for instance, from a few centimeters to several tens of centimeters and the inside diameter of which is, for instance, a few millimeters, which tube may be straight or constricted, for example, at its lower end. The association of the coagulation bath 15 and this tube 21, sometimes referred to as "coagulation tube" or "spinning tube," is known to the person skilled in the art for the spinning of conventional aramid fibers. The use of the tube 21, however, is not necessary in the apparatus 1.

The depth of coagulating liquid 19 in the coagulation bath 15, measured between the entrance surface 17 of the coagulation bath 15 and the entrance of the spinning tube 21 may vary for instance from a few millimeters to several centimeters, too great a depth being possibly harmful to the quality of the product in view of the hydrodynamic tensions which may be developed, in particular at the highest spinning speeds, upon passage through this first coagulating layer.

One of the essential characteristics of the method of the invention resides in the fact that the dynamic contact times of the thread 20 with the coagulating medium 19 should, in most cases, be substantially greater than the contact times which can be reached after simple passage through the bath 15 and the spinning tube 21 as previously described.

The lengthening of these contact times may be effected by any suitable means. Rather than using coagulation baths 15 and/or tube 21 of very great depth or length, typically several meters, it is preferred, for instance, in view, in particular, of the problems of hydrodynamic tension mentioned above, to use at least one additional coagulation device 22 which extends the bath 15 and the tube 21, this device 22 being placed at the outlet of the spinning tube 21, immediately behind a point of deflection 25. The device 22 is, for instance, formed of baths, pipes or chambers in which the coagulating medium 19 circulates, or of a combination of these different elements which, for purposes of simplification, have not been shown in the drawing and the length and configuration of which can be adapted with great flexibility to the specific conditions of the production, in particular to the diameter of the monofilament. The thread 20 in course of coagulation is preferably subjected to tensions of less than 3 cN/tex.

The total dynamic contact time "t" of the thread with the coagulating medium 19 is expressed as a function of the square of the monofilament diameter D of the finished product, in accordance with the relationship $t = KD^2$ t being expressed in seconds, D being expressed in millimeters, and K in sec/mm², K being the "coagulation constant."

By total dynamic contact time of the thread 20 with the coagulating medium 19 there is understood the total time during which the monofilament is immersed in the coagulating medium or in contact with said medium upon passage of the thread 20 in the coagulation devices previously described, that is to say the bath 15, the tube 21 and the device 22. The latter should assure an effective renewal of the coagulating medium at the surface of the moving monofilament in course of formation, the coagulation medium 19 being at the temperature Tc. In this, any additional coagulation device such as described above cannot be assimilated to a simple washing device in which one could, for instance, use neutral or basic aqueous solutions at substantially elevated temperature in order to improve the extraction kinetics of the residual solvent after the coagulation phase.

In the process according to the invention, the composition of the coagulating medium 19 and its temperature Tc may be selected the same or different in the devices 15, 21 and 22.

After the coagulation phase carried out in the devices 15, 21 and 22, the thread 20 which has been formed is washed in order to eliminate the residual acid which it contains, this washing being effected in optimal manner by any known means, for instance by washing with water or even with alkaline aqueous solutions, possibly at high temperature in order to improve the kinetics. This washing can be effected, for instance, by collecting the thread 20 at the outlet of the device 22 on the bobbin 23 which is driven by the motor 24, this bobbin being immersed for a few hours in a tank continuously fed with fresh water.

The spinning draw factor SDF is defined as the ratio between the speed V2 of the first drive device encountered by the thread 20 and the speed V1 of the jet 12 in the capillary 10, this drive device being, for instance, incorporated in the device 22.

After washing, the thread 20 is dried, for instance on a bobbin at room temperature or even in an oven, or by passing the thread over heated cylinders. The drying temperature is preferably at most 200° C.

The apparatus 1 could be so arranged that the washing and drying operations are carried out as a continuation of the extrusion and coagulation operations.

In the dry thread 20, the final content of sulfuric acid, or base if a basic wash liquid is used, is preferably less than 0.01% by weight, referred to the weight of dry thread.

The as-spun monofilaments thus obtained are then contacted with a treatment solvent capable of rapidly dissolving their surface so as to produce a slightly structured skin. Such a solvent is, for instance, sulfuric acid, chlorosulfonic acid or fluosulfonic acid. This treatment solvent is preferably concentrated sulfuric acid of a concentration by weight close to 100%.

Figure 3:
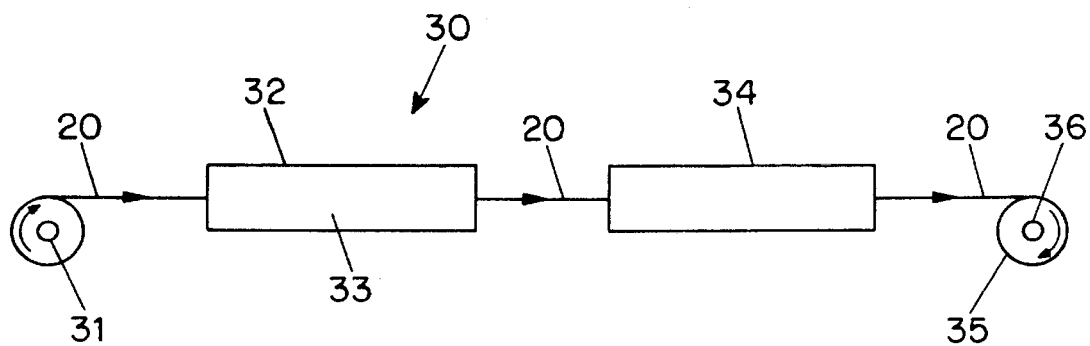
FIG. 3 shows a treatment apparatus which, combined with the apparatus of FIG. 1, makes it possible to carry out the process of the invention.

FIG. 3 diagrammatically shows one possible example of a treatment device 30. The monofilament 20 in as-spun state is extracted from its storage bobbin by means of an unwinder 31 and then penetrates into treatment means 32 containing a treatment solvent 33 capable of rapidly dissolving the surface of the monofilament 20. The treatment means 32 are formed, for instance, of a tank or chamber in which the solvent 33 rests or circulates. The time of contact of the monofilament 20 with the solvent 33 is indicated as Tt and the treatment speed, that is to say the speed of passage of this monofilament 20 upon this contact, is indicated as Vt.

Upon emergence from the means 32, the treated monofilament 20 is washed with fresh water in washing means 34 formed, for instance, of pipes, tanks or chambers. The surface dissolving which was produced upon contact with the solvent 33 is then stopped by elimination of this solvent; the portion of dissolved polymer which is present on the periphery of the monofilament 20 precipitates and a slightly structured skin is formed. Upon emergence from the washing means 34, the thread 20 can be collected, for instance, on the bobbin 35 which is driven by the motor 36, and then dried at room temperature, or even in an oven, on this bobbin. It may also be sent directly into a drying chamber and dried on heating cylinders, the treatment, washing and drying operations being thus carried out continuously. The drying temperature is preferably at most 200° C.

The thread 20 which has thus been finished has the diameter D previously defined. The final content of solvent 33 in the finished thread 20 is preferably less than 0.01% by weight, referred to the weight of this thread.

The present invention is not limited to the use of cylindrical extrusion capillaries, and the method of the invention can, for instance, be carried out with capillaries of conical shape or with non-circular extrusion holes of different shapes, for instance holes of rectangular or oval shape in order, for instance, to produce monofilaments of oblong type. Under these conditions, the definitions of the invention given previously apply very generally, the expression "diameter D" representing the smallest dimension of the monofilament and the expression "diameter d" the smallest dimension of the extrusion hole, D and d being determined in sections perpendicular to the fiber axis or the direction of flow in the extrusion capillary.

Various additives or substances such as, for instance, plasticizers, lubricants and products capable of improving the adhesiveness of the product to a rubber matrix, may possibly be incorporated into the polymer or into the spinning solution or applied to the surface of the monofilament during the different steps of the process of the invention described above.

III. Embodiments

The following Table 1 sets forth special conditions for the production of monofilaments in accordance with the invention using the process previously described. This table also gives the diameter D, expressed in µm, of these monofilaments. This table contains 23 examples, marked A-1 to Q-1. In the case of some of these examples, the conditions of their production were modified only in the treatment device 30; these examples have therefore been grouped in the same series (E, F or J).

A. Synthesis of the Aromatic Polyamides Used

The polymer used is poly(p-phenylene terephthalamide) except in Examples M1 to P1, in which there are used copolyamides of PPTA type synthesized by replacing a molar fraction of p-phenylene diamine (PPDA) or of terephthalic acid dichloride (TADC) by substitution monomers, all available on the market and which are produced by known methods which, for purposes of simplification, are not described here. The purity of these monomers is indicated by the suppliers as being greater than 97%, and they are used without additional purification.

A total of 4 different aromatic copolyamides are prepared in accordance with the following scheme:

Example M-1: Monomers: PPDA, TADC, adipic acid dichloride (AADC), with 1 Mol of AADC to 100 Mols of acid dichlorides;

Example N-1: Monomers: PPDA, TADC, AADC, with 3 Mols of AADC to 100 Mols of acid dichlorides;

Example O-1: Monomers: PPDA, TADC, 1,5-naphthylene diamine (NDA), with 3 Mols of NDA to 100 Mols of diamines;

Example P-1: Monomers: PPDA, TADC, fumaric acid dichloride (FADC), with 3 Mols of FADC to 100 Mols of acid dichlorides.

B. Preparation of Spinning Solutions, Spinning and Treatment of the Monofilaments One proceeds in the following manner:

For the placing in solution of the polymer, there is used a sulfuric acid of a concentration by weight of between about 99.5% and 100.5%.

The temperature of the extruder 4 and the temperature of the spinning pump 6 are between 90° and 100° C.

Cylindrical extrusion capillaries are used, except in example Q1 in which the cross-section of the capillary (that is to say, perpendicular to the axis xx') is of ellipsoidal shape, the parameter d then representing the smallest dimension of the capillary, and the largest dimension of the capillary being 2000 µm in this section.

The non-coagulating layer 13 is a layer of air.

The coagulating medium 19 is an aqueous solution of sulfuric acid containing less than 5% by weight of acid, except in Examples K-1, L-1, M-1 and O-1 in which other coagulating media are used.

More precisely, in the first coagulation device formed of the bath 15 and the tube 21 associated with it, the following substances are used:

Example K-1: Aqueous solution of sulfuric acid containing 25% by weight acid, maintained at a temperature of +7° C.

Example L-1: Ethylene glycol, maintained at a temperature of −8° C.

Example M-1: Aqueous solution of sulfuric acid containing 25% by weight acid, maintained at a temperature of −10° C.

Example O-1: Aqueous solution of sulfuric acid containing 18% by weight acid, maintained at a temperature of −5° C.

In Examples K-1, L-1 and M-1, the coagulating medium used in the additional coagulation device 22 is an aqueous solution of sulfuric acid containing less than 5% by weight of acid and maintained at a temperature of +7° C., while in Example O-1 the composition and the temperature of the coagulating medium remain unchanged as compared to those used in the devices 15 and 21.

In Examples L-1 and M-1 it can be noted that the temperature of the coagulating medium Tc is not maintained constant during the passage through the devices 15, 21 and 22. Nevertheless, this temperature still remains in accord with the invention since it is at most equal to +7° C.

The monofilament 20 is removed directly at the outlet of the coagulation device 22 onto the bobbin 23. The length of monofilament on the bobbin taken is variable but always greater than 1000 meters (for instance, greater than 5000 meters for all examples C-1 to G-1).

The bobbins are then immersed for a few hours in a tank continuously fed with fresh water for washing, before the drying operation.

The monofilaments which have thus been washed are, via an unwinding device, dried by passage over cylinders heated to a temperature of between 140° C. and 170° C. and wound on a receiving bobbin.

The solvent 33 is concentrated sulfuric acid of about 99.5%.

The treatment means 32 comprise a polypropylene tank on the ends of which two series of Teflon pulleys are fastened. These pulleys, assembled in parallel, turn independently of each other, driven by the thread 20, their lower part dipping into the acid. They guide this thread 20 which moves forward and backward between the two ends of the tank. The time of contact Tt of the thread 20 with the solvent 33 can be adjusted by the number of pulleys used and/or by the speed Vt of passage of the monofilament in the means 32.

The washing means 34 comprise a polypropylene pipe in which fresh water flows in countercurrent direction, extended by a wash chamber in which the monofilament 20 is then wound on driven cylinders and sprayed with water. The temperature of the wash water is between 8° and 12° C. For such conditions, a wash time at least equal to the time Tt makes it possible to eliminate completely the solvent 33.

The treated and washed monofilament 20 is removed at the outlet of the washing means 34 on the bobbin 35; it is then dried, via an unwinding device, by passage over cylinders heated to a temperature of between 140° and 170° C. and wound on a receiving bobbin, except in the case of Example D-1, in which the monofilament coming from the washing means 34 is sent directly onto heating cylinders for drying, the treatment, washing and drying operations being then carried out continuously. The length of monofilament on the final receiving bobbin is variable, but it is always greater than 500 m (for instance greater than 4000 m in the case of Examples C-1 and G-1).

The abbreviations and units used in Table 1 are as follows:

No: test number;

I.V.(p): inherent viscosity of the polymer (in dl/g);

C: concentration of polymer in the solution (% by weight);

d: diameter of the capillary of the spinneret (in μm);

l/d: ratio of length to diameter of the capillary, l being the length of the capillary in μm;

β: opening angle of the convergent preceeding the capillary (in degrees);

Tf: spinning temperature (in degrees Celsius);

e: thickness of the noncoagulating layer (in mm);

$V_2$: speed of widening (in m/min);

SDF: spinning draw factor;

Tc: temperature of the coagulating medium (in degrees Celsius);

t: time of dynamic contact with the coagulating medium (in sec);

K: coagulation constant (in sec/mm²);

Vt: speed of treatment (in m/min);

Tt: time of contact with the treatment solvent (in sec);

D: diameter of the monofilament in micrometers (μm).

TABLE 1

| No | I.V. (p) | c | d | l/d | β | Tf | e | $V_2$ | SDF | $T_c$ | t | K | Vt | Tt | D |
|---|---|---|---|---|---|---|---|---|---|---|---|---|---|---|---|
| A-1 | 5.3 | 20.4 | 400 | 2 | 60 | 85 | 10 | 300 | 2.6 | 8 | 6.1 | 403 | 60 | 14 | 123 |
| B-1 | 5.4 | 20.6 | 800 | 2 | 60 | 80 | 10 | 200 | 7.6 | 8 | 9.2 | 444 | 50 | 30 | 144 |
| C-1 | 6.3 | 20.4 | 1200 | 2 | 60 | 86 | 10 | 200 | 10.9 | 8 | 11.4 | 360 | 80 | 30 | 178 |
| D-1 | 6.1 | 20.4 | 1200 | 2 | 60 | 85 | 10 | 200 | 10.8 | 6 | 11.4 | 356 | 80 | 30 | 179 |
| E-1 | 6.3 | 20.3 | 1200 | 2 | 65 | 86 | 12 | 200 | 10.9 | 8 | 11.4 | 348 | 120 | 20 | 181 |
| E-2 | 6.3 | 20.3 | 1200 | 2 | 65 | 86 | 12 | 200 | 10.9 | 8 | 11.4 | 344 | 80 | 30 | 182 |
| E-3 | 6.3 | 20.3 | 1200 | 2 | 65 | 86 | 12 | 200 | 10.9 | 8 | 11.4 | 340 | 40 | 60 | 183 |
| F-1 | 6.1 | 20.4 | 1000 | 2 | 65 | 85 | 10 | 200 | 7.6 | 6 | 11.4 | 344 | 120 | 10 | 182 |
| F-2 | 6.1 | 20.4 | 1000 | 2 | 65 | 85 | 10 | 200 | 7.7 | 6 | 11.4 | 348 | 60 | 20 | 181 |
| F-3 | 6.1 | 20.4 | 1000 | 2 | 65 | 85 | 10 | 200 | 7.5 | 6 | 11.4 | 340 | 40 | 30 | 183 |
| F-4 | 6.1 | 20.4 | 1000 | 2 | 65 | 85 | 10 | 200 | 7.5 | 6 | 11.4 | 340 | 20 | 60 | 183 |
| G-1 | 6.1 | 20.4 | 1000 | 2 | 65 | 91 | 10 | 200 | 7.7 | 6 | 11.4 | 348 | 60 | 25 | 181 |
| H-1 | 5.6 | 20.7 | 1400 | 2 | 60 | 86 | 12 | 150 | 10.3 | 9 | 15.2 | 317 | 50 | 30 | 219 |
| I-1 | 5.2 | 20.0 | 1800 | 2 | 60 | 90 | 12 | 90 | 7.6 | 7 | 25.3 | 253 | 25 | 96 | 316 |
| J-1 | 6.4 | 20.4 | 1800 | 2 | 60 | 92 | 10 | 100 | 4.9 | 7 | 22.8 | 135 | 50 | 30 | 411 |
| J-2 | 6.4 | 20.4 | 1800 | 2 | 60 | 92 | 10 | 100 | 5.0 | 7 | 22.8 | 140 | 19 | 157 | 404 |
| K-1 | 5.9 | 20.5 | 1100 | 2 | 65 | 86 | 12 | 150 | 7.2 | 7 | 15.2 | 365 | 65 | 30 | 204 |
| L-1 | 5.9 | 20.2 | 1100 | 2 | 65 | 86 | 12 | 150 | 6.8 | ≦7 | 15.2 | 358 | 65 | 30 | 206 |
| M-1 | 5.5 | 20.1 | 800 | 2 | 60 | 90 | 10 | 300 | 10.2 | ≦7 | 7.5 | 496 | 60 | 20 | 123 |
| N-1 | 5.7 | 20.1 | 900 | 2 | 60 | 85 | 12 | 150 | 4.2 | 7 | 15.2 | 332 | 65 | 30 | 214 |
| O-1 | 5.6 | 20.5 | 900 | 2 | 60 | 90 | 12 | 200 | 5.6 | −5 | 11.4 | 323 | 65 | 30 | 188 |
| P-1 | 5.1 | 20.5 | 900 | 2 | 60 | 85 | 12 | 300 | 8.3 | 8 | 7.6 | 329 | 60 | 20 | 152 |
| Q-1 | 5.8 | 20.2 | 800 | 4 | 65 | 85 | 4 | 220 | 12.3 | 3 | 10.0 | 756 | 85 | 20 | 115 |

The physical and mechanical properties of the monofilaments obtained are given in the following Table 2, the meaning of the symbols and units used being as follows:

No: test number

D: diameter (in μm)

Ti: titer (in tex)

T: tenacity (in cN/tex)

Ar: elongation upon rupture (in %)

Mi initial modulus (in cN/tex)

Er energy upon rupture per unit of mass (in J/g)

I.V.(f): inherent viscosity (in dl/g)

ρ: density (in g/cm³)

In Example Q-1, the diameter D represents the smallest dimension of the oblong monofilament in a section perpendicular to its longitudinal axis, its largest dimension in this same section being equal to about 350 μm.

These two dimensions are measured by optical microscopy on a transverse cut of the monofilament, said cut being oriented along a section perpendicular to the longitudinal axis, the monofilament being previously coated with a resin of epoxy type in order to facilitate the cutting operation.

TABLE 2

| No | D | Ti | T | Ar | Mi | Er | I.V. (f) | ρ |
|---|---|---|---|---|---|---|---|---|
| A-1 | 123 | 16.8 | 159 | 3.93 | 5536 | 32.7 | 4.7 | 1.421 |
| B-1 | 144 | 22.9 | 150 | 4.17 | 5060 | 32.4 | 4.9 | 1.414 |
| C-1 | 178 | 35.5 | 162 | 4.40 | 5197 | 35.6 | 5.6 | 1.419 |
| D-1 | 179 | 35.7 | 155 | 4.32 | 5148 | 34.6 | 5.4 | 1.417 |
| E-1 | 181 | 36.6 | 157 | 4.32 | 4895 | 33.9 | 5.8 | 1.416 |
| E-2 | 182 | 36.9 | 157 | 4.43 | 4908 | 34.7 | 5.8 | 1.413 |
| E-3 | 183 | 36.9 | 151 | 4.57 | 4580 | 34.4 | 5.9 | 1.407 |
| F-1 | 182 | 37.0 | 162 | 4.29 | 5143 | 34.9 | 5.6 | 1.423 |
| F-2 | 181 | 36.4 | 169 | 4.52 | 5072 | 38.1 | 5.5 | 1.419 |
| F-3 | 183 | 37.5 | 162 | 4.51 | 4936 | 36.9 | 5.6 | 1.418 |
| F-4 | 183 | 37.2 | 154 | 4.51 | 4873 | 35.2 | 5.5 | 1.414 |
| G-1 | 181 | 36.5 | 160 | 4.58 | 5030 | 37.1 | 5.5 | 1.419 |
| H-1 | 219 | 53.6 | 123 | 3.79 | 4577 | 24.1 | 5.1 | 1.421 |

TABLE 2-continued

| No | D | Ti | T | Ar | Mi | Er | I.V. (f) | ρ |
|---|---|---|---|---|---|---|---|---|
| I-1 | 316 | 110.1 | 75 | 3.23 | 3391 | 12.9 | 4.8 | 1.405 |
| J-1 | 411 | 185.9 | 53 | 2.50 | 2872 | 7.1 | 5.3 | 1.404 |
| J-2 | 404 | 181.5 | 48 | 2.64 | 2558 | 6.8 | 5.3 | 1.416 |
| K-1 | 204 | 46.4 | 137 | 3.88 | 4989 | 27.4 | 5.7 | 1.422 |
| L-1 | 206 | 47.2 | 127 | 3.71 | 4722 | 24.3 | 5.7 | 1.421 |
| M-1 | 123 | 16.8 | 149 | 4.05 | 5001 | 31.5 | 5.0 | 1.420 |
| N-1 | 214 | 51.0 | 112 | 3.71 | 4369 | 21.8 | 5.4 | 1.418 |
| O-1 | 188 | 39.3 | 133 | 3.71 | 4816 | 25.4 | 5.3 | 1.417 |
| P-1 | 152 | 25.9 | 136 | 3.80 | 4707 | 26.4 | 4.7 | 1.422 |
| Q-1 | 115 | 35.3 | 166 | 4.26 | 5269 | 35.7 | 5.6 | 1.424 |

The monofilaments thus obtained are in accordance with the invention since they satisfy all the following relationships:

$1.7 \leq Ti \leq 260$;

$40 \leq D \leq 480$;

$T \geq 180 - D/3$;

$Mi \geq 1600$;

$Ar > 2.00$;

$Er > 20.0 - D/30$.

Preferably these monofilaments satisfy the following relationships:

$T \geq 200 - D/3$;

$Mi \geq 6400 - 10D$;

$Ar > 3.00$;

$Er > 30.0 - D/30$.

Even more preferably, they satisfy the following relationships:

$T \geq 220 - D/3$;

$Mi \geq 6800 - 10D$;

$Ar > 4.00$;

$Er > 40.0 - D/30$.

It is even noted that, for certain embodiments, at least one of the following relationships is satisfied:

$T \geq 225 - D/3$;

$Ar > 4.50$;

$Er > 42.5 - D/30$.

Preferably, the following relationships exist:

$4.0 \leq Ti \leq 260$; $60 \leq D \leq 480$.

The monofilaments in accordance with the invention are furthermore characterized by high values of inherent viscosity I.V.(f), all higher than 4.0 dl/g and preferably at least equal to 4.5 dl/g and even more preferably at least 5.0 dl/g.

These monofilaments also have a high density ρ which is greater than 1.380 g/cm³ and preferably greater than 1.400 g/cm³.

These monofilaments in accordance with the invention therefore have high physical and mechanical properties.

Their values of elongation upon rupture are, for instance, greater for the most part than those described in a large number of patents and patent applications for conventional multifilament fibers, or filaments of small diameter, of PPTA (see, for instance, EP-A-21,484, EP-A-168,879, EP-A-248, 458, U.S. Pat. Nos. 3,869,430, 4,698,414, 4,702,876, 4,721, 755, 4,726,922, 4,835,223, 4,869,860).

Entirely unexpectedly, it is noted that the monofilaments of a diameter as high as 180 μm may, by reason of their high values of elongation on rupture and tenacity, have energies at rupture per unit of mass which may be of the same order of magnitude as, or even higher than, those described for conventional fibers or filaments of PPTA (see, for example, U.S. Pat. Nos. 3,869,430, 4,698,414, 4,726,922).

The values of initial modulus and tenacity are very high for monofilament diameters which are so large. One notes in particular tenacities at least equal to 150 cN/tex for all the examples of PPTA monofilaments the diameter D of which is less than 200 μm, and greater than 160 cN/tex for some of them. For these same examples, the initial modulus Mi is always greater than 4500 cN/tex.

The monofilaments in accordance with the invention are characterized by a slightly structured skin. This skin extends from the surface of the monofilament to a depth which varies from a few tenths of a micrometer to several micrometers, for instance, as a function of the time of contact (Tt) with the treatment solvent. The slightly structured character of this skin can be shown by electronic microdiffraction analyses carried out on longitudinal cuts of these monofilaments.

Wherever the place analyzed (part of the cut corresponding to the skin of the monofilament or part corresponding to the core of the monofilament), the as-spun monofilaments, such as described in U.S. Pat. No. 5,246,776 are characterized always by a diffraction spectrum having numerous intense and very clearly defined spots, which is typical of a strongly crystallized and oriented structure.

Such spots are absent from a microdiffraction spectrum recorded at the skin of the monofilaments of the invention, such a spectrum having at most only a few very diffuse spots which are poorly defined and of very limited number, disclosing a slightly structured state.

In the core of the monofilaments of the invention, the microdiffraction spectrum is typical of a strongly crystallized and oriented structure, such as defined above for as-spun monofilaments.

Optical microscope observations made in polarized light on transverse sections of these monofilaments of the invention also confirm a very different structure between the core and the skin.

The skin of the monofilaments of the invention proved to constitute a true protective sheathing for these monofilaments, conferring upon them, in particular, a greatly improved resistance to fibrillation and abrasion as compared with that of the as-spun filaments.

In order to appreciate the resistance to fatigue and to abrasion of fibers, it is known to use a "filament against filament" friction test in which a dynamic filament repeatedly transversely abrades a static filament, these two filaments being maintained under tension, the dynamic filament being furthermore curved around the static filament with an angle of about 90°. This type of test has been used, in particular, for conventional aramid filaments of small diameter (see, for example, EP-A-218,269, U.S. Pat. No. 4,721, 755).

Some of the monofilaments in accordance with the invention of the preceding examples were subjected to such an auto-abrasion test under curvature by means of the device described in detail in section I of chapter I and their response to the test was compared with that of the corresponding monofilament in the as-spun state, that is to say without surface treatment. For this comparative study, the test was carried out in accordance with the following particular structural conditions:

the tensions T1 and T2 at the start of the test are equal to about 2.5 cN/tex and 1.25 cN/tex, respectively;

the dynamic filament abrades the static filament at the rate of 50 cycles per minute, in accordance with a reciprocating movement of an amplitude of about 30 mm.

The results are set forth in Table 3 below, the abbreviations used being the following:

No: test number (corresponding to certain examples of Table 1);

N1: average number of auto-abrasion cycles recorded up to rupture in the case of the as-spun monofilament;

N2: average number of auto-abrasion cycles recorded up to rupture in the case of the monofilament of the invention.

TABLE 3

| No  | N1  | N2  |
|-----|-----|-----|
| A-1 | 188 | 273 |
| B-1 | 285 | 418 |
| E-1 | 359 | 522 |
| E-2 | 359 | 584 |
| E-3 | 359 | 733 |
| F-2 | 293 | 462 |
| F-3 | 293 | 508 |
| H-1 | 195 | 307 |

Whatever the example considered, it is noted that the number of auto-abrasion cycles withstood by the monofilament of the invention (N2) is always at least 45% greater than the number of cycles withstood by the corresponding as-spun monofilament (N1), N2 being even greater by more than 100% than N1 in the case of Example E-3, corresponding to a time Tt of contact with the treatment solvent of 60 seconds.

This better fatigue and abrasion resistance of the monofilaments of the invention is due, in particular, to an excellent resistance to fibrillation.

The as-spun monofilaments generally have an irregular and channeled surface which can be easily characterized under an electronic scanning microscope, this surface being all the rougher in general the larger the monofilament diameter. The surface of these monofilaments possesses poor cohesion and frequent fibrillation phenomena can be noted.

The monofilaments of the invention, in their turn, are characterized by a much smoother and more uniform surface, furthermore without fibrillation.

Examination under an electron scanning microscope shows, for instance, that after 200 cycles of auto-abrasion undergone in accordance with the conditions described above by the monofilament of the invention of Example F-3, the surface of the dynamic filament which was in contact with the static filament still appears almost intact and without fibrillation. In the case of the corresponding as-spun monofilament which underwent 200 abrasion cycles, this surface, on the other hand, was broken up and gave rise to a very strongly fibrillated structure.

Figure 4:
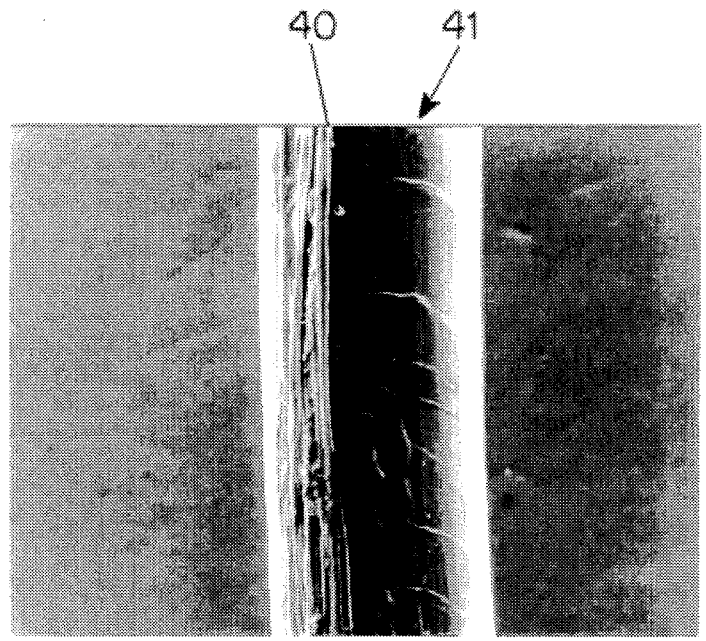
FIGS. 4 and 5 each show a monofilament after abrasion, seen under an electron microscope, the monofilament of FIG. 4 being one in accordance with the invention.
Figure 5:
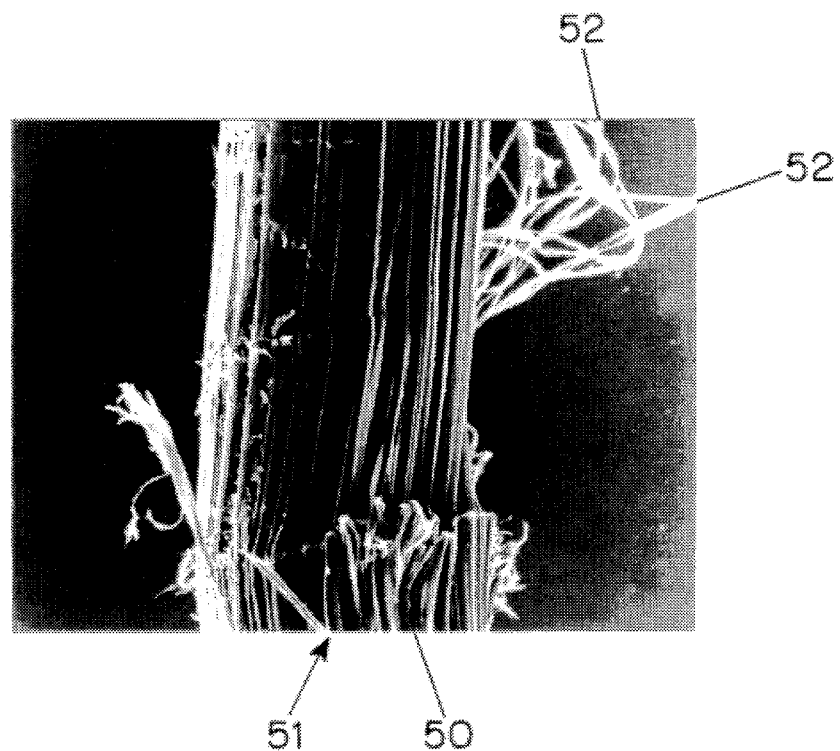

FIG. 4 shows this surface 40 of the dynamic filament 41 in the case of the monofilament F-3 in accordance with the invention, and FIG. 5 shows this strongly fibrillated structure 50 of the dynamic filament 51 in case of the corresponding as-spun monofilament, certain of the fibrils being provided with the reference numeral 52.

The monofilaments in accordance with the invention are therefore characterized by high resistance to abrasion and fibrillation, as compared with that of the as-spun monofilaments.

Furthermore, entirely unexpectedly, it is noted that the surface treatment to which the monofilaments of the invention are subjected is generally accompanied by an improvement in certain mechanical properties as compared with those of the as-spun monofilaments; these are, first of all, the elongation upon rupture and the energy upon rupture, and also the tenacity.

In order to illustrate this, there have been selected from among the examples of Table 2 above, the monofilaments showing the best combination of mechanical properties in terms of tenacity, elongation upon rupture and energy upon rupture, and these final properties were compared with those obtained just prior to the surface treatment, that is to say, on the corresponding as-spun monofilaments. This Table 4 also sets forth the diameter Do of these as-spun monofilaments as well as the diameter D of the monofilaments of the invention. The diameter Do and the mechanical properties of the as-spun monofilaments were measured or calculated by the methods described in Chapter I. Except for the precision of measurement or calculation, the diameters Do and D are identical.

The abbreviations and units used in this Table 4 are as follows:

No: test number (corresponding to certain examples of Table 1);

Do: diameter (in μm) of the as-spun monofilament;

To: tenacity (in cN/tex) of the as-spun monofilament;

(Ar)o: elongation upon rupture (in %) of the as-spun monofilament;

(Er)o: energy upon rupture per unit of mass (in J/g) of the as-spun monofilament;

D: diameter (in μm) of the monofilament of the invention;

T: tenacity (in cN/tex) of the monofilament of the invention;

Ar: elongation upon rupture (in %) of the monofilament of the invention;

Er: energy upon rupture per unit of weight (in J/g) of the monofilament of the invention.

TABLE 4

| No  | Do  | To  | (Ar)o | (Er)o | D   | T   | Ar   | Er   |
|-----|-----|-----|-------|-------|-----|-----|------|------|
| C-1 | 181 | 141 | 3.62  | 25.2  | 178 | 162 | 4.40 | 35.6 |
| D-1 | 182 | 148 | 3.91  | 28.3  | 179 | 155 | 4.32 | 34.6 |
| E-2 | 181 | 156 | 4.00  | 30.2  | 182 | 157 | 4.43 | 34.7 |
| E-3 | 181 | 156 | 4.00  | 30.1  | 183 | 151 | 4.57 | 34.4 |
| F-1 | 182 | 151 | 4.02  | 29.8  | 182 | 162 | 4.29 | 34.9 |
| F-2 | 182 | 150 | 4.01  | 29.2  | 181 | 169 | 4.52 | 38.1 |
| F-3 | 182 | 151 | 4.02  | 29.8  | 183 | 162 | 4.51 | 36.9 |
| F-4 | 182 | 147 | 3.89  | 28.0  | 183 | 154 | 4.51 | 35.2 |
| G-1 | 181 | 142 | 3.94  | 27.6  | 181 | 160 | 4.58 | 37.1 |

The as-spun monofilaments of this Table 4 are characterized by very high mechanical properties since they all satisfy at least one of the following relationships:

To $\geq 210 - Do/3$;

(Ar)o $> 4.0$;

(Er)o $> 30.0 - Do/30$.

In most cases, their tenacity To and their elongation upon rupture (Ar)o satisfy in particular the best preferential relationships claimed for as-spun aramid monofilaments in U.S. Pat. No. 5,246,776 referred to above.

These very high properties nevertheless are below those of the monofilaments of the invention. From a reading of Table 4, it is noted, in fact, that whatever the example in question, the elongation upon rupture and the energy upon rupture of the treated monofilaments are always greater than those of the corresponding as-spun products; the tenacity also is in all cases improved, with the exception of Example E-3 corresponding to a time Tt of contact with the treatment solvent of 60 seconds. After treatment, the gain in the energy upon rupture in particular is always greater than 10%, and may even reach more than 30% in the case of Examples C-1, F-2 and G-1.

In particular, the monofilaments of the invention in these examples of Table 4 all satisfy at least one of the following relationships, at least two in the majority of cases, and even three simultaneously in the case of Examples F-2, F-3 and G-1:

T≧220–D/3;

Ar>4.50;

Er>40.0–Do/30;

while none of the corresponding as-spun monofilaments satisfies even one of the equivalent relationships, that is to say:

To≧220–Do/3;

(Ar)o>4.50;

(Er)o>40.0–Do/30.

The method of the invention, therefore, makes it possible to produce aramid monofilaments which not only have a high resistance to abrasion and fibrillation but also high or very high mechanical properties and, in particular, a high energy upon rupture. In the majority of cases, the tenacity and the elongation upon rupture of these monofilaments are, for the same diameter, greater than those of the aramid monofilaments described in the aforesaid U.S. Pat. No. 5,246,776.

In the method of the invention, at least one of the following relationships is preferably satisfied:

I.V.(p)≧5.3 dl/g;

C≧20 2%

Tf≦90° C.;

Tc≦10° C.;

K≧200 sec/mm²;

l/d≦10;

5 degrees≦β≦90 degrees;

3 mm≦e≦20 mm;

2≦SDF≦15;

Tt≧5 sec.

Preferably, the inherent viscosities I.V.(f) and I.V.(p), expressed in dl/g, are related by the relationship:

$$I.V.(f) \geq I.V.(p) - 1.2,$$

the degradation of the polymer during the different steps of dissolving, spinning and treatment of the monofilament thus remaining very limited.

Furthermore, it is noted that the slightly structured skin of the monofilaments of the invention makes it possible after coating treatments to obtain a better adhesion to the rubber compositions than that obtained, under the same conditions of coating, with the monofilaments in the as-spun state, as shown by the following examples.

In order to determine the adhesion of the monofilaments in accordance with the procedure described in Section J of Chapter I, assemblages of these monofilaments are first of all produced. These assemblages are cabled yarns which have the formula (1+5)18 and (1+6)18, that is to say they are formed, in the first case, of six monofilaments (one monofilament serving as core, plus a layer of five monofilaments helically surrounding the core) and, in the second case, of seven monofilaments (one monofilament serving as core, plus a layer of six monofilaments helically surrounding the core). All these monofilaments are of PPTA and they have a diameter of 180 μm. The acute angle which each monofilament of the layers makes with the axis of the assemblage is about 6°, the diameter of the assemblages being about 540 μm and each of the monofilaments being practically without any twist on itself.

The assemblages used are of four types:

Type A: (1+6)18; monofilaments in the as-spun state, not in accordance with the invention, prepared in accordance with U.S. Pat. No. 5,246,776.

Type B: (1+6)18; monofilaments according to the invention, the time of contact with the treatment solvent (concentrated sulfuric acid of about 99.5%) being 30 seconds;

Type C: (1+5)18; monofilaments identical to those of Type B;

Type D: (1+5)18; monofilaments according to the invention, the time of contact with the treatment solvent (concentrated sulfuric acid of about 99.5%) being 60 seconds.

Prior to the adhesion test, the assemblages are subjected to the following coating treatments.

The assemblages pass through a first bath having the following composition (parts by weight):

| | |
|---|---|
| Epoxy resin (1) | 5.0 |
| Aerosol (2) | 0.3 |
| NaOH soda | 0.3 |
| Water | 994.4 |

(1) resin bearing the brand name DENACOL EX 512 of the NAGASE Company
(2) aerosol bearing the brand name OT of American Cyanamid.

The assemblages then undergo a heat treatment between 210° and 260° C., for instance at 250° C., for a period of time of between 20 and 120 seconds, for example 30 seconds.

They are then passed into a second bath having the following composition (parts by weight):

| | |
|---|---|
| Latex VP 41% (1) | 319 |
| Ammonia | 25 |
| Sizing resin | 149 |
| Water | 507 |

(1) latex terpolymer butadiene/styrene/vinyl pyridine 70:15:15 in a concentration of 41% in water.

The sizing resin itself has the following composition (parts by weight):

| | |
|---|---|
| Resorcinol | 65 |
| 1N Caustic soda | 44 |
| 31% Formaldehyde | 114 |
| Water | 777 |

A heat treatment is then carried out between 210° and 260° C., for example at 250° C., for a period of time of between 20 and 120 seconds, for instance 30 seconds.

The assemblages which have been treated in this manner are then subjected to the adhesion test described in Section J of Chapter I.

The results are given in the following Table 5. In this table all the tear-off values are referred arbitrarily to the same base of 100 which corresponds to the tear-off value measured for the assemblage of Type A tested at 20° C. They are therefore relative values.

TABLE 5

| Type of Assemblage | Adhesion at 20° C. | Adhesion at 120° C. |
|---|---|---|
| A | 100 | 59 |
| B | 146 | 100 |

TABLE 5-continued

| Type of Assemblage | Adhesion at 20° C. | Adhesion at 120° C. |
|---|---|---|
| C | 140 | 102 |
| D | 137 | 95 |

On basis of this Table 5 it is noted that the adhesion of the monofilaments in accordance with the invention (assemblages of Type B, C, D) for a given test temperature is far greater than the adherence of the monofilaments not in accord with the invention (assemblage of Type A). It is furthermore noted that the hot adhesion (test at 120° C.) of the monofilaments of the invention is substantially equal to the cold adhesion (test at 20° C.) of the monofilaments not in accord with the invention.

In conclusion, with respect to the monofilament described in the said U.S. Pat. No. 5,246,776, the monofilament of the invention having a slightly structured skin unexpectedly shows on the one hand clearly improved properties with regard both to adhesion, resistance to fatigue and abrasion and, furthermore, substantial improvement in certain of its dynamometric properties, in particular the energy upon rupture.

The monofilaments of the invention can be used, for instance, to produce assemblages, particularly assemblages such that these monofilaments are practically helically wound around an axis, the acute angle γ which each monofilament makes with this axis, assumed to be rectilinear, being less than 30°, the twist of each monofilament on itself being less than 10 turns per meter of assemblage. These assemblages may, for instance, be produced with methods and cabling devices similar to those used to produce assemblages with metal wires. It goes without saying that other uses are possible.

Of course, the invention is not limited to the embodiments previously described.

We claim:

1. An aramid monofilament characterized by the following features:
   a. it satisfies the relationships:
      $1.7 \leq Ti \leq 260$;
      $40 \leq D \leq 480$;
      $T \geq 180 - D/3$;
      $Mi \geq 1600$;
      $Ar > 2.00$;
      $Er \geq 20.0 - D/30$;

Ti being the titer in tex, D being the diameter in μm (micrometer), T being the tenacity in cN/tex, Mi being the initial modulus in cN/tex, Ar being the elongation upon rupture in %, Er being the energy upon rupture per unit of mass in J/g in the case of this monofilament;
   b. it has a slightly structured skin.

2. An aramid monofilament according to claim 1, characterized by the following relationships:
   $T \geq 200 - D/3$; $Mi \geq 6400 - 10D$; $Ar > 3.00$;
   $Er > 30.0 - D/30$.

3. An aramid monofilament according to claim 2, characterized by the following relationships:
   $T \geq 220 - D/3$; $Mi \geq 6800 - 10D$; $Ar > 4.00$;
   $Er > 40.0 - D/30$.

4. An aramid monofilament according to claim 1, characterized by the following relationship:
   $T \geq 225 - D/3$.

5. An aramid monofilament according to claim 1, characterized by the following relationship:
   $Ar > 4.50$.

6. An aramid monofilament according to claim 1, characterized by the following relationship:
   $Er > 42.5 - D/30$.

7. An aramid monofilament according to claim 1, characterized by the following relationship:
   $\rho > 1.380$, $\rho$ being its density expressed in g/cm$^3$.

8. An aramid monofilament according to claim 7, characterized by the following relationship:
   $\rho > 1.400$.

9. An aramid monofilament according to claim 1, characterized by the following relationship:
   $I.V.(f) > 4.0$, $I.V.(f)$ being its inherent viscosity expressed in dl/g.

10. An aramid monofilament according to claim 9, characterized by the following relationship:
    $I.V.(f) \geq 4.5$.

11. An aramid monofilament according to claim 10, characterized by the following relationship:
    $I.V.(f) \geq \geq 5.0$.

12. An aramid monofilament according to claim 1, characterized by the fact that it comprises p-phenylene terephthalamide units.

13. An aramid monofilament according to claim 1, characterized by the fact that it consists of poly(p-phenylene terephthalamide).

14. A method of producing an aramid monofilament having a slightly structured skin and satisfying the following relationships:
    $1.7 \leq Ti \leq 260$;
    $40 \leq D \leq 480$;
    $T \geq 180 - D/3$;
    $Mi \geq 1600$;
    $Ar > 2.00$;
    $Er \geq 20.0 - D/30$;

Ti being the titer in tex, D being the diameter in μm (micrometer), T being the tenacity in cN/tex, Mi being the initial modulus in cN/tex, Ar being the elongation upon rupture in %, Er being the energy upon rupture per unit of mass in J/g in the case of this monofilament; said method comprising the following steps:
    (a) forming a solution of at least one aromatic polyamide such that at least 85% of the amide linkages (—CO—NH—) are joined directly to two aromatic rings, the inherent viscosity I.V.(p) of this polyamide or these polyamides being at least equal to 4.5 dl/g, the concentration C of polyamide(s) in the solution being at least 20% by weight, said spinning composition being optically anisotropic in the molten state and at rest;
    (b) extruding, as a liquid jet, the solution formed in step (a) in a spinneret through a capillary the diameter d of which is greater than 80 μm, the spinning temperature Tf, that is to say the temperature of the solution upon its passage through the capillary, being at most equal to 105° C.;
    (c) drawing, as a liquid vein, the liquid jet emerging from the capillary in a non-coagulating layer of fluid;
    (d) introducing the drawn liquid vein obtained in step (c) into a coagulating medium to subsequently form a monofilament, the monofilament which is thus in the course of formation remaining in dynamic contact with the coagulating medium for the time t, the temperature of the coagulating medium Tc being at most equal to 16° C.;

(e) washing and drying the monofilament;

(f) contacting the washed and dried monofilament with a solvent for this monofilament, this treatment solvent rapidly dissolving its surface so as to produce a slightly structured skin;

(g) washing and drying the monofilament obtained in step (f); the diameter D of the dry monofilament which has thus been finished and the time t defined in step (d) are related by the following relationships:

$t = KD^2$; $K > 30$, t being expressed in seconds and D being expressed in millimeters.

15. A method according to claim 14, characterized by the fact that at least one of the following relationships is satisfied:

$I.V.(p) \geq 5.3$ dl/g; $C \geq 20.2\%$; $Tf \leq 90°$ C.; $Tc \leq 10°$ C.; $K \geq 200$ sec/mm².

16. A method according to claim 14, characterized by the fact that at least one of the following relationships is satisfied:

$l/d \leq 10$; 5 degrees $\leq \beta \leq 90$ degrees; 3 mm $\leq e \leq 20$ mm; $2 \leq SDF \leq 15$; $Tt \geq 5$ sec, l being the length of the capillary in μm, β being the angle of opening of a convergent preceding the capillary, e being the thickness of the non-coagulating layer, SDF being the spinning draw factor, Tt being the time of contact with the treatment solvent.

17. A method according to claim 14, characterized by the fact that the coagulating medium is an aqueous solution of sulfuric acid.

18. A method according to claim 14, characterized by the fact that the monofilament in the course of coagulation is subjected to tensions of less than 3 cN/tex.

19. A method according to claim 14, characterized by the fact that the treatment solvent is concentrated sulfuric acid of a concentration by weight of close to 100%.

20. A method according to claim 14, characterized by the fact that the drying temperature is at most equal to 200° C.

21. A method according to claim 14, characterized by the fact that the inherent viscosities I.V.(f) and I.V.(p), expressed in dl/g, are related by the relationship:

$I.V.(f) \geq I.V.(p) - 1.2$, I.V.(f) being the inherent viscosity of the monofilament.

22. A method according to claim 14, characterized by the fact that the spinning solution is prepared with sulfuric acid in a concentration by weight of about 100%.

23. A method according to claim 14, characterized by the fact that it is carried out on basis of at least one aromatic polyamide comprising p-phenylene terephthalamide units.

24. A method according to claim 14, characterized by the fact that the polyamide is poly(p-phenylene terephthalamide).

* * * * *

UNITED STATES PATENT AND TRADEMARK OFFICE
CERTIFICATE OF CORRECTION

PATENT NO. : 5,582,911

DATED : December 10, 1996

INVENTOR(S) : Meraldi et al.

It is certified that error appears in the above-indentified patent and that said Letters Patent is hereby corrected as shown below:

Col. 1, line 6, "filed ad" should read --filed as--;

Col. 1, line 25, "3772" should read --372--;

Col. 3, line 23, "tax" should read --tex--;

Col. 3, after line 45, please insert --OVER 36 TO 53 - 22.5 --

Col. 6, following line 35, insert --SBR: Styrene-butadiene copolymer rubber;--;

Col. 6, line 58, "units" should read --units.--;

Col. 6, line 61, "thalene" should read --thylene--; and "thylene" should be deleted Col. 7, line 57, "with to" should read --with--;

Col. 9, line 51, "thread" should read --thread 20--;

Col. 11, line 65, "placing in solution" should read --dissovling--;

Col. 13, line 54, "preceeding" should read --preceding--;

UNITED STATES PATENT AND TRADEMARK OFFICE
CERTIFICATE OF CORRECTION

PATENT NO. : 5,582,911
DATED : December 10, 1996
INVENTOR(S) : Meraldi et al.

It is certified that error appears in the above-indentified patent and that said Letters Patent is hereby corrected as shown below:

Col. 13, line 59, "speed of widening" should read --winding speed--;

Col. 16, line 41, "filaments" should read --monofilaments--;

Col. 16, line 60, "structural conditions" should read "conditions--;

Col. 18, line 31, "weight" should read --mass--;

Col. 19, line 8, "Do/30" should read --D/30--;

Col. 22, line 22, "≥ ≥" should read --≥--; and

Col. 24, line 17, "I.V. (f)" (2nd occurrence) should start a new line.

Signed and Sealed this

Sixteenth Day of September, 1997

Attest:

BRUCE LEHMAN

Attesting Officer

Commissioner of Patents and Trademarks